DAVID D. STELLE.
Improvement in Rub Irons for Vehicles.
No. 118,402.  Patented Aug. 22, 1871.
Fig. 1.
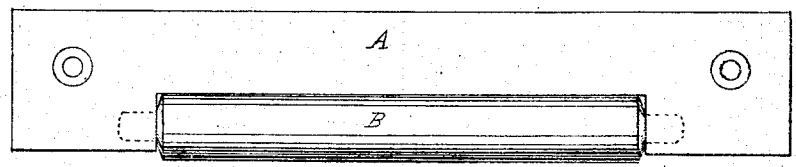
Fig. 3.  Fig. 2.
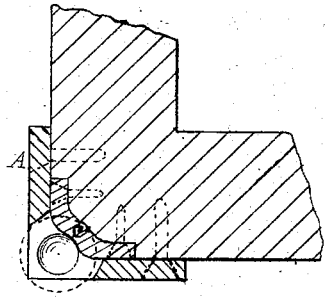 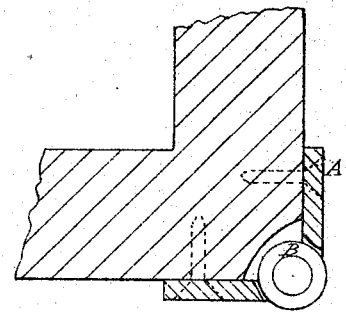
Witnesses:  Inventor:
Kate N. Jones.  D. D. Stelle
W. W. Phillips  Per Rush Fraser & Osgood
  attys

118,402

UNITED STATES PATENT OFFICE.

DAVID D. STELLE, OF NEW BRUNSWICK, NEW JERSEY.

IMPROVEMENT IN RUB-IRONS FOR VEHICLES.

Specification forming part of Letters Patent No. 118,402, dated August 22, 1871.

*To all whom it may concern:*

Be it known that I, DAVID D. STELLE, of New Brunswick, in the State of New Jersey, have invented an Improved Rub-Iron for Wagons, of which the following is a specification:

It is known that the ordinary guard-plate or rub-iron used on wheeled carriages is subject to rapid wear from the friction of the wheel-tire, augmented by the sand and earthy matter adhering to the latter; that in order to withstand the wear and afford protection it has to be made to project considerably from the carriage-body, in consequence of which mud lodges on it, rendering handsome vehicles unsightly; and that the tire is apt to catch and adhere from the great friction, and cause much inconvenience in turning.

It is the object of my invention to obviate these objections; and it consists of an angular casting to fit the edge of the wagon-body or frame, provided with a friction-roller journaled in a slot or recess at the angle thereof so that the tire comes in contact with the roller alone.

Figure 1 is a side elevation; Fig. 2, a cross-section of the plate and portion of the wagon-body to which it is attached, with an end view of the roller; and Fig. 3 is a similar section with the roller removed, showing a removable bearing for one of the journals.

For ordinary vehicles I cast a plate, A, of rectangular form and provided with a suitable number of holes through its sides for attaching it to the wood with screws. The roller B lies in a longitudinal slot or recess in the angle of the casting, its journals being cast with the plate; or, if preferred, one may be fixed and the other c removable and attached to the wood with screws previous to affixing the part A, which form enables the roller to be removed from its bearings at any time by simply taking off the plate A from the wagon.

For fine carriages I prefer to make the plate A with unequal sides, the larger to be placed on the under side of the carriage-body so as to be less conspicuous, and the smaller or that which appears on the side may be merely a flange to serve to fit the angle of the wood to which it is attached. In this case the angle is recessed in the same manner to the extent required to receive the roller, which, with its bearings, may be made to project more in a downward direction to adapt it to the more elevated position with regard to the wheels, and to better prevent mud or dirt getting on the side of the carriage.

The roller may be roughened or corrugated on the surface, if necessary to insure its revolving from the rubbing of the tire against it, and it may be chilled casting, to prevent wear of the journals.

Not only does this device prevent the catching of the wheel in short turnings, but obviates wear both of itself and the tire, and its shape is such as not to retain mud or dirt which may be scraped from the wheels.

I claim as my invention—

An improved rub-iron for vehicles, consisting of the plate A and roller B arranged substantially as set forth, the plate A being angular to fit the lower edge of the wagon-body, and having bearings for the roller.

In witness whereof I have hereunto signed my name in the presence of two subscribing witnesses.

DAVID D. STELLE.

Witnesses:
K. N. JONES,
WM. F. MCNAMARA.